(12) United States Patent
Yoshida et al.

(10) Patent No.: US 10,227,066 B2
(45) Date of Patent: Mar. 12, 2019

(54) OPERATION MODE CONTROL DEVICE, METHOD FOR CONTROLLING OPERATION MODE, MOVABLE BODY, OUTPUT CONTROL DEVICE, CHARGE DISCHARGE CONTROL DEVICE, AND ELECTRONIC DEVICE

(71) Applicants: Masaaki Yoshida, Kanagawa (JP); Hideo Yanagita, Tokyo (JP)

(72) Inventors: Masaaki Yoshida, Kanagawa (JP); Hideo Yanagita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 14/969,250

(22) Filed: Dec. 15, 2015

(65) Prior Publication Data
US 2016/0185340 A1 Jun. 30, 2016

(30) Foreign Application Priority Data

Dec. 26, 2014 (JP) ................................ 2014-266027
Oct. 27, 2015 (JP) ................................ 2015-210933

(51) Int. Cl.
*B60W 20/13* (2016.01)
*B60W 10/06* (2006.01)
(Continued)

(52) U.S. Cl.
CPC ............... *B60W 20/13* (2016.01); *B60K 6/48* (2013.01); *B60W 10/06* (2013.01); *B60W 10/08* (2013.01);
(Continued)

(58) Field of Classification Search
CPC .................................................. B60W 20/13
See application file for complete search history.

(56) References Cited

U.S. PATENT DOCUMENTS

| | | | |
|---|---|---|---|
| 2010/0145560 A1* | 6/2010 | Komatsu | B60K 6/365 701/22 |
| 2014/0186696 A1 | 7/2014 | Onagi et al. | |
| 2014/0228168 A1* | 8/2014 | Kaufman | B60K 6/442 477/5 |

FOREIGN PATENT DOCUMENTS

| | | |
|---|---|---|
| JP | 2011-218854 | 11/2011 |
| JP | 2013-058442 | 3/2013 |
| JP | 2014-043183 | 3/2014 |

OTHER PUBLICATIONS

Zhenyu Chen, Changsong Dai, Gang Wu, Mark Nelson, Xinguo Hu, Ruoxin Zhang, Jiansheng Liu, Jicai Xia, High performance Li3V2(PO4)3/C composite cathode material for lithium ion batteries studied in pilot scale test, In Electrochimica Acta, vol. 55, Issue 28, 2010, pp. 8595-8599. (Year: 2010).*

(Continued)

*Primary Examiner* — Genna M Mott
(74) *Attorney, Agent, or Firm* — IPUSA, PLLC

(57) ABSTRACT

An operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, wherein the operation mode control device is configured to control to switch between a first mode, in which only power of the motor operates, and a second mode, in which both the power of the motor and power of the engine operate, wherein the operation mode is controlled to have an operation range, in which the second mode is performed when an output is on the side of lower residual capacity than the local minimum value.

4 Claims, 14 Drawing Sheets

(51) Int. Cl.
*B60W 10/08* (2006.01)
*B60K 6/48* (2007.10)

(52) U.S. Cl.
CPC .... *B60W 2510/244* (2013.01); *Y02T 10/6221* (2013.01); *Y02T 10/6269* (2013.01); *Y02T 10/6286* (2013.01); *Y10S 903/93* (2013.01)

(56) References Cited

OTHER PUBLICATIONS

Yong Zhang et al. "Effects of nickel-doped lithium vanadium phosphate on the performance of lithium-ion batteries", Journal of Alloys and Compounds, vol. 542, 2012, pp. 187-191. (Year: 2012).*

* cited by examiner

OPERATION MODE CONTROL DEVICE, METHOD FOR CONTROLLING OPERATION MODE, MOVABLE BODY, OUTPUT CONTROL DEVICE, CHARGE DISCHARGE CONTROL DEVICE, AND ELECTRONIC DEVICE

BACKGROUND OF THE INVENTION

1. Field of the Invention

The present invention generally relates to an operation mode control device, a method for controlling operation mode, a movable body, an output control device, a charge discharge control device, and an electronic device.

2. Description of the Related Art

Examples of movable bodies enabled to perform a hybrid run, represented by a plug-in hybrid electric vehicle (PHEV) and a hybrid electric vehicle (HEV), frequently uses a commercial-off-the-shelf battery.

Patent Document 1: Japanese Laid-Open Patent Publication No. 2014-43183

SUMMARY OF THE INVENTION

It is a general object of at least one embodiment of the present invention to provide an operation mode control device that substantially obviates one or more problems caused by the limitations and disadvantages of the related art.

One aspect of the embodiments of the present invention may be to provide an operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, the operation mode control device including a first mode, in which only power of the motor operates the operation mode control device, and a second mode, in which both the power of the motor and power of the engine operate, wherein the operation mode is controlled to have an operation range, in which the second mode is performed when an output is on the side of lower residual capacity than the local minimum value.

One aspect of the embodiments of the present invention may be to provide an operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, wherein the operation mode control device is configured to control to switch between a first mode, in which only power of the motor operates, and a second mode, in which both the power of the motor and power of the engine operate, wherein the operation mode is controlled to have an operation range, in which the second mode is performed when an output is on the side of lower residual capacity than the local minimum value.

DETAILED DESCRIPTION OF THE PREFERRED EMBODIMENTS

Figure 1:
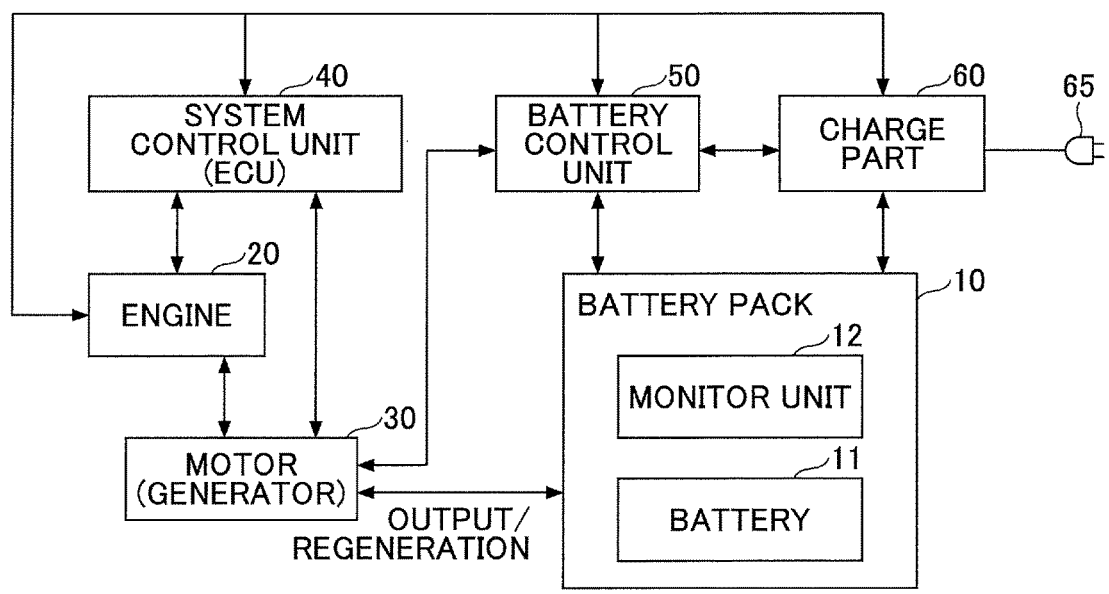
FIG. 1 illustrates a schematic structure of a hybrid vehicle to which an operation mode control device of a first embodiment is applicable.

In the above examples of the lithium-ion battery and the nickel-hydrogen cell, a drop of the output of the battery becomes great so as to lower motor drive capability in response to a drop of a SOC. As a result, there are deficiencies such that an assist performance effected by the battery is insufficient and a fuel consumption is bad. Further, in the HEV, a smaller amount of the battery is preferable to assist a run while maintaining the output. Therefore, the battery is preferably used on its high SOC side. As a result, there are drawbacks that degradation of the storing battery is conspicuous and the life duration is shortened. Here, the state of charge (SOC) is a residual capacity of the battery.

For example, the PHEV performs an EV run of using only the motor and the battery without using the engine on a high SOC side (a range of high SOC) of the battery, and the PHEV performs an HEV run of using the engine and the motor in combination on a low SOC side (a range of low SOC) of the battery. Then, in a case where the motor drive capability is lowered due to a drop of the battery output caused by a drop of the SOC in the EV run in PHEV and therefore the engine needs to be started, an output of the battery is consumed for starting the engine. Thus, a motor drive capability is further lowered.

In order to solve the problem, there is proposed a technique of delaying the timing of starting the engine by giving high priority to the output from the battery even the SOC drops (Patent Document 1).

However, the above technique does not fundamentally solve a shortage of the battery output in the case where the SOC drops. Therefore, with the above technique, drawbacks such as a lowered running performance, a drop of the fuel consumption, and a shortened life duration of the battery mounted in the vehicle are not solved.

The present invention is provided in consideration of the above, and the object of the embodiments of the present invention is to provide an operation mode control device enabling to improve the running performance and the fuel consumption of a movable body of performing the hybrid run and prolong the life duration of the battery mounted on the movable body.

A description is given below, with reference to the FIG. 1 through FIG. 19 of embodiments of the present invention. Where the same reference symbols are attached to the same parts, repeated description of the parts is omitted.

REFERENCE SYMBOLS TYPICALLY DESIGNATE AS FOLLOWS

1: electronic device
10: battery pack
11: battery
12: monitor unit
20: engine
30: motor
40: system control unit
50: battery control unit
51: battery condition detection part
52: memory part
53: SOC estimation part
54: SOC determination part
55: communication part
56: battery output control part
60: charge part
65: external power source plug
100: battery pack
200: protection circuit First Embodiment Hereinafter, preferred embodiments of the present invention are explained with reference to accompanying drawings. The same reference symbols are attached to the same parts, repeated description of the parts may be omitted.

FIG. 1 illustrates a schematic structure of a hybrid vehicle to which an operation mode control device of a first embodiment is applicable. Referring to FIG. 1, a battery pack 10 includes a battery 11 and a monitor unit 12. At least one battery 11 may be included in the battery pack 10. However, two or more batteries 11 may be connected in series or in parallel for obtaining a high output.

The battery is a chargeable and dischargeable battery. The battery 11 is, for example, a lithium-ion battery. The monitor unit 12 has a function of monitoring a condition of the battery 11. The monitor unit 12 may include a voltage sensor, a current sensor, a temperature sensor, and/or the like.

An engine 20 is a known internal combustion engine using gasoline, light gas oil, or the like as a fuel. A motor is a known motor generator functioning as both a motor and a generator. The battery 11 has a role of supplying electric power to the motor functioning as the motor and a role of storing regeneration energy from the motor functioning as the generator.

In the hybrid vehicles including the PHEV and the HEV, the engine 20 and the motor 30 are used in combination. At least one of a power output from the engine 20 and a power output from the motor 30 causes the hybrid vehicle to run.

A system control unit 40 is an electronic control unit (ECU) structured to enable to control switching between the EV mode (a first mode) of operating by only the power of the motor 30 and the HEV mode (a second mode) of operating by using the power of the motor 30 and the power of the engine 20 in combination. The system control unit 40 may be structured to undertake various controls such as a control of charging the battery 11 and a control of regeneration operation.

The system control unit 40 may be structure to include, for example, a central processing unit, a read only memory (ROM), a random access memory (RAM), a main memory, and so on. In this case, various functions of the system control unit 40 are substantialized such that a program stored in a ROM or the like is read out to a main memory and executed by a CPU. The CPU of the system control unit 40 reads data out of a RAM and stores the data into the RAM as needed basis. The system control unit 40 is a typical example of an operation mode control device of the embodiment of the present invention.

The battery control unit 50 has a function of administering and controlling a charge discharge condition of the battery 11 and charges the battery 11 through the charge part 60. In a case where the hybrid vehicle is the PHEV, the charge part 60 is provided with an external power source plug 65. By plugging the external power source plug 65 into an outlet, a direct charge is possible.

The battery control unit 50 may be structured to include, for example, a CPU, a ROM, a RAM, a main memory, or the like. In this case, various functions of the battery control unit 50 are substantialized such that a program stored in the ROM or the like is read out to the main memory and executed by the CPU. The CPU of the battery control unit 50 reads data out of the RAM and stores the data into the RAM as needed basis. The system control unit 40 and the battery control unit 50 are structured so as to be able to mutually transmit and receive data by a controller area network or the like.

However, a part of the function of the battery control unit 50 may be undertook by the system control unit 40, and a part of the function of the system control unit 40 may be undertook by the battery control unit 50. Further, the system control unit 40 and the battery control unit 50 may be substantialized as a physically single ECU or may be substantialized as three or more ECUs.

Figure 2:
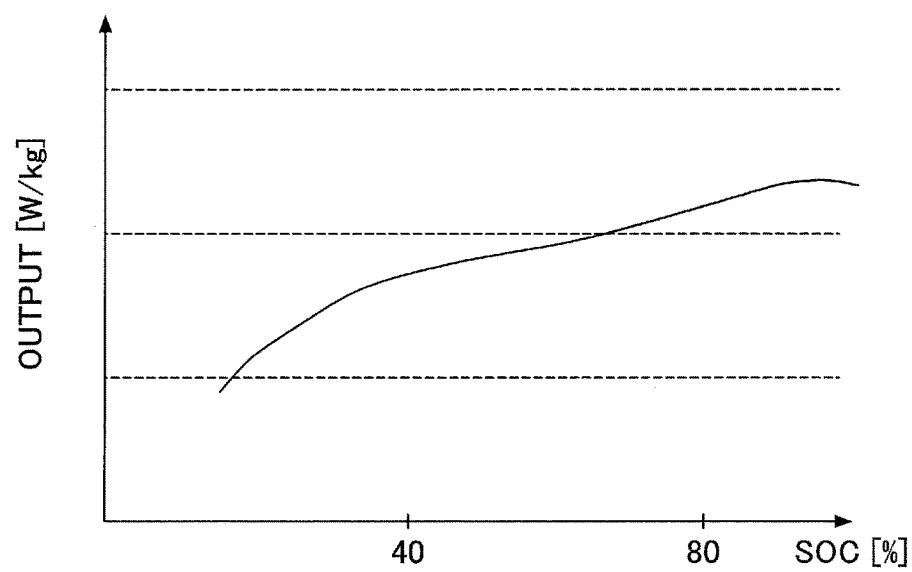
FIG. 2 illustrates a SOC-output property of an ordinary lithium-ion battery.

Described here is the SOC-output property (a residual capacity-output property) of the battery 11. FIG. 2 illustrates a SOC-output property of an ordinary lithium-ion battery. FIG. 2 illustrates an exemplary SOC-output property of a battery of the first embodiment. Referring to FIG. 2, in the ordinary lithium-ion battery, the output has a property of monotonic decrease, in which the output is high on a high SOC side and low on a low SOC side.

On the contrary thereto, the battery 11 of the first embodiment has an output property in which the output on the low SOC side is higher than the output on a part of the high SOC side. Said differently, the battery 11 has a SOC-output property where a local minimum value O1 exists at a predetermined residual capacity (around SOC=40% in the example of FIG. 3) and a local maximum value O2 exists at a predetermined residual capacity on a lower SOC side than the local minimum value O1. The output of the battery 11 may have another local maximum value on a higher SOC side than the local minimum value O1.

Figure 3:
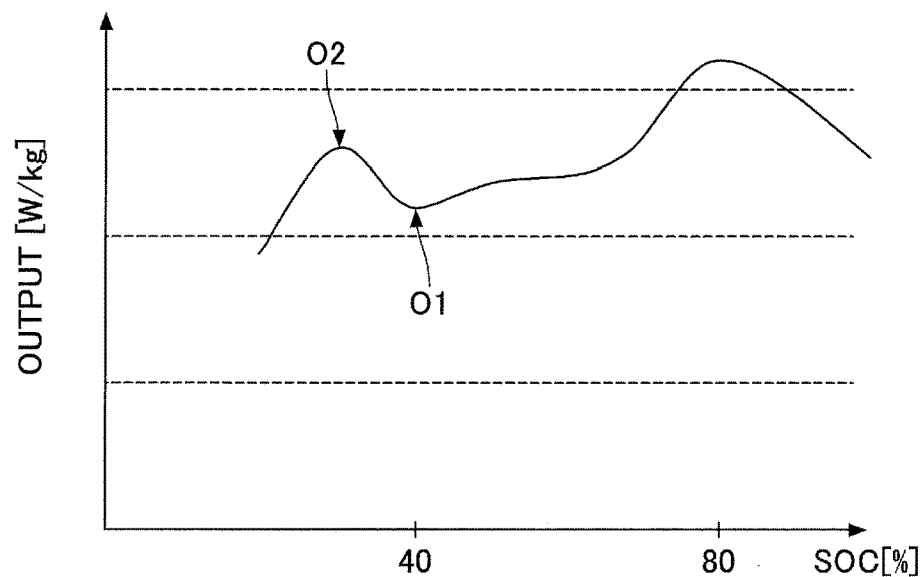
FIG. 3 illustrates an exemplary SOC-output property of a battery of the first embodiment.

An electrode formed by mixing materials having different output properties relative to the battery voltage may be used in order to cause the battery 11 to have the property illustrated in FIG. 3. A specific example of the battery 11 is a lithium-ion battery having a positive electrode formed by mixing lithium vanadium phosphate having a basic skeleton of $Li_3V_2(PO_4)_3$ or an analogous compound (hereinafter, also referred to as lithium vanadium phosphate) formed by denaturating a part of the structure of lithium vanadium phosphate with a ternary material (nickel, cobalt, aluminum, or the like). Although it is difficult to increase a capacity of lithium vanadium phosphate alone (for example, 100 Wh/kg or greater), lithium vanadium phosphate is a material advantageous in increasing the output. The ternary material is advantageous in increasing the capacity. The material of a negative electrode is, for example, graphite.

Within the first embodiment, the system control unit 40 controls so that the output of the battery 11 has at least an operation range, in which the hybrid vehicle is operated in the HEV mode, on a lower SC side than the local minimum value O1. In this case, it is preferable that the hybrid vehicle is controlled to be operated in the HEV mode at least at the residual capacity where the output of the battery 11 is the local maximum value $O_2$. With this, because the output property in the HEV mode can be sufficiently secured, the running performance as the hybrid vehicle is not spoiled. Further, because the output of the engine is suppressed, the fuel can be saved to improve the fuel consumption.

Figure 4:
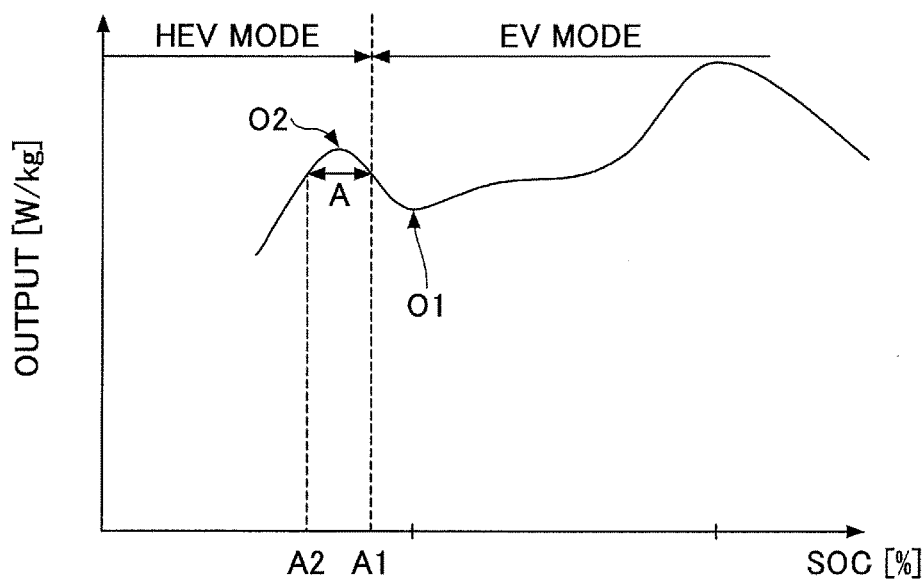
FIG. 4 illustrates a mode switching of the first embodiment.

It is possible to freely determine a value of the residual capacity at which the EV mode and the HEV mode are switched over depending on a design considering a running property or the like of the hybrid vehicle. For example, in order to utilize the motor assist in the HEV mode, it is preferable to use a range A (a range between SOC=A1 to SOC=A2) in the vicinity of the local maximum value $O_2$ in FIG. 4. FIG. 4 illustrates a mode switching of the first embodiment.

Here, A1 may be properly determined. For example, A1 may be the SOC corresponding to a value about midway between the local maximum value $O_2$ and the local minimum value O1. Further, A2 may be properly determined. For example, A2 may be the SOC, which is on the lower SOC side of the local maximum value $O_2$ and substantially corresponds to the same level of the output corresponding to A1.

Figure 5:
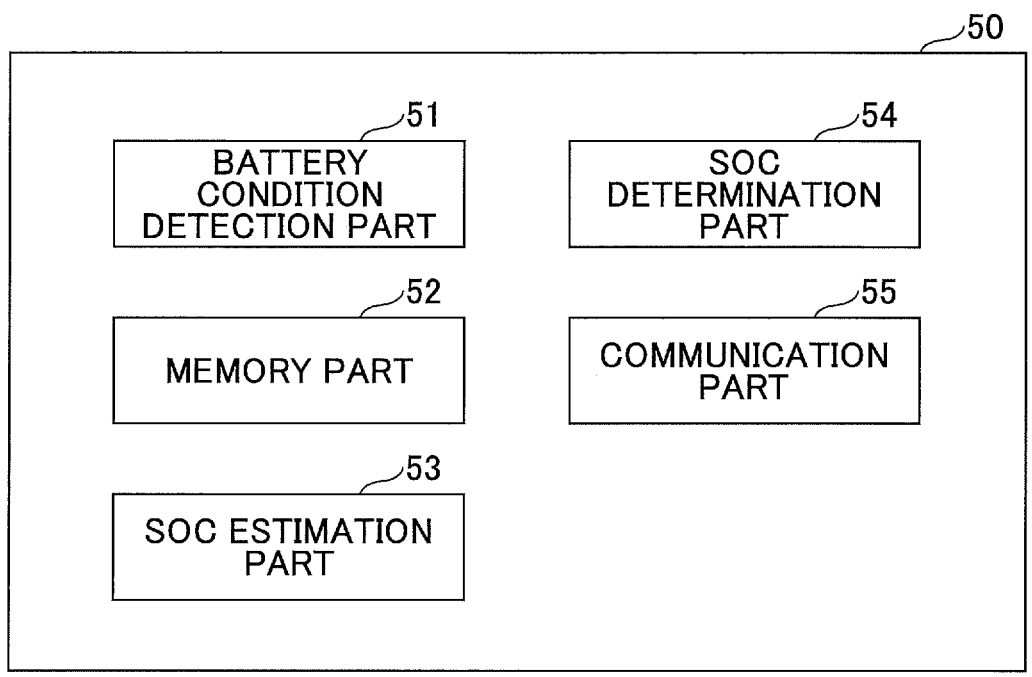
FIG. 5 is an exemplary functional block chart of a battery control unit of the first embodiment.
Figure 6:
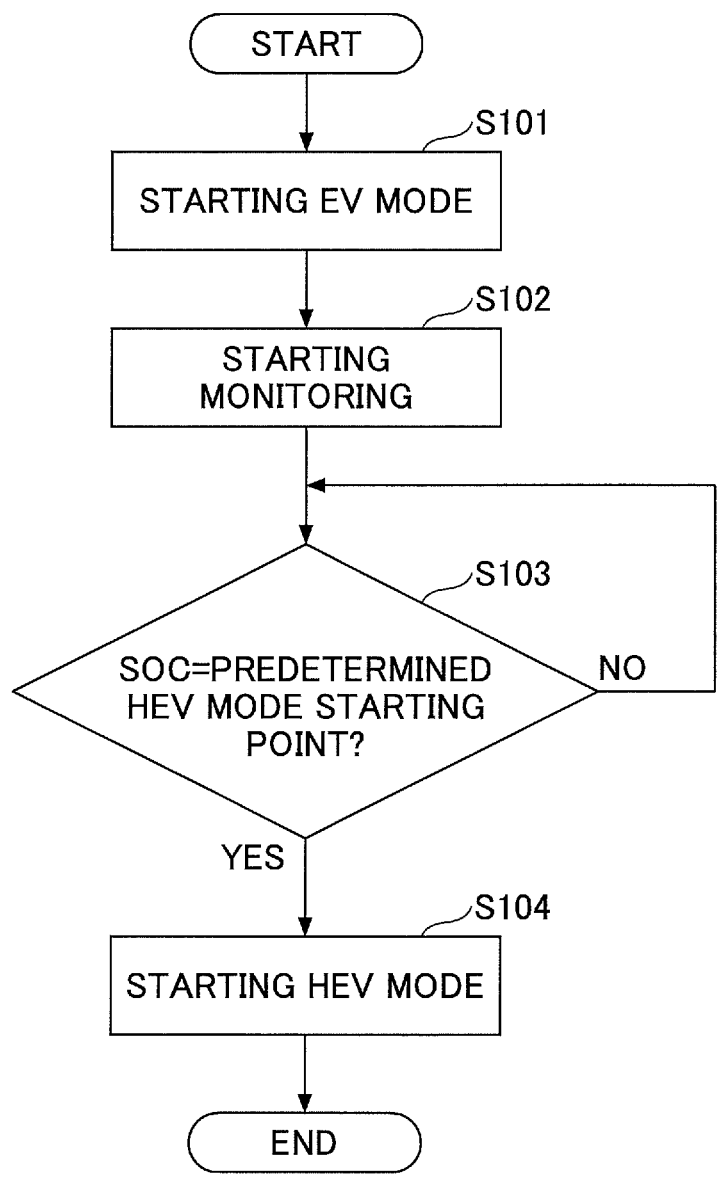
FIG. 6 is an exemplary flow chart of the mode switching of the first embodiment.

Referring to a functional block chart of the battery control unit illustrated in FIG. 5, the flow chart illustrated in FIG. 6, and FIGS. 1 and 4, described is a control in a case where the HEV mode is performed in only the range A of FIG. 4. FIG. 5 is an exemplary functional block chart of the battery control unit. FIG. 6 is an exemplary flow chart of the mode switching of the first embodiment. Here, the initial state of the SOC of the battery 11 is around 100%.

At first, in step S101 of FIG. 6, the system control unit 40 starts the EV mode. Said differently, the engine is not used and only the motor 30 is used to run the hybrid vehicle.

Next, in step S102, the monitor unit 12 starts monitoring (monitor) of the battery 11. The monitor unit 12 monitors the voltage, the current, and the temperature of the battery 11.

Next, in step S103, the battery control unit 50 estimates the present SOC of the battery 11 based on information monitored by the monitor unit 12. Then, it is determined whether the present SOC reaches a predetermined residual capacity (a predetermined residual capacity) which is a starting point of the HEV mode. Within the first embodiment, only the range A of FIG. 4 is a HEV run range, the predetermined residual capacity corresponding to the HEV mode start point is SOC=A1 of FIG. 4.

Specifically, the battery condition detection part 51 of the battery control unit 50 illustrated in FIG. 5 continuously detects the voltage of battery 11 based on the information obtained by monitoring in the monitor unit 12. The SOC estimation part 53 reads a table illustrating a relationship between the voltage and the SOC, which are stored in the memory part 52, and estimates the SOC corresponding the present voltage of the battery 11 based on the read table. The SOC determination part 54 determines whether the SOC estimated by the SOC estimation part 53 reaches the predetermined residual capacity A1.

It is preferable to cause multiple tables indicating relationships between the voltage and the SOC corresponding to the temperature of the battery 11 to be stored in the memory part 52. It is possible to improve an accuracy of the SOC when the battery condition detection part 51 detects the temperature of the battery 11 based on the information monitored by the monitor unit 12 and the SOC estimation part 53 reads out the table corresponding to the present temperature.

In a case where the SOC determination part 54 determines that the present SOC does not reaches a predetermined residual capacity corresponding to the HEV mode start point, the process of step S103 is repeated while continuing the EV mode. On the other hand, in a case where the SOC determination part 54 determines that the present SOC reaches the residual capacity corresponding to the HEV mode start point, the process goes to step S104.

In step S104, the communication part 55 sends a mode switching signal to the system control unit 40. The system control unit 40 receiving the mode switching signal switches the EV mode to the HEV mode and starts the HEV mode. Said differently, the engine and the motor 30 are used in combination to run the hybrid vehicle.

Thereafter, in a case where the SOC reaches the point A2, the hybrid vehicle may run using only the engine 20 without using the motor 30.

As described, the battery having the rise of the output on the low SOC side (the battery having the SOC-output property having a local minimum value and a local maximum value on a side of lower residual capacity than the local minimum value) is applicable to the hybrid vehicle including PHEV and HEV. Then, the hybrid vehicle is controlled such that a predetermined SOC range including the SOC corresponding to the local maximum value on the side of lower SOC than the local minimum value is used for the HEV mode. As a result, the running performance and the fuel consumption are improved in the PHEV, and the life duration is prolonged in the HEV.

Figure 7:
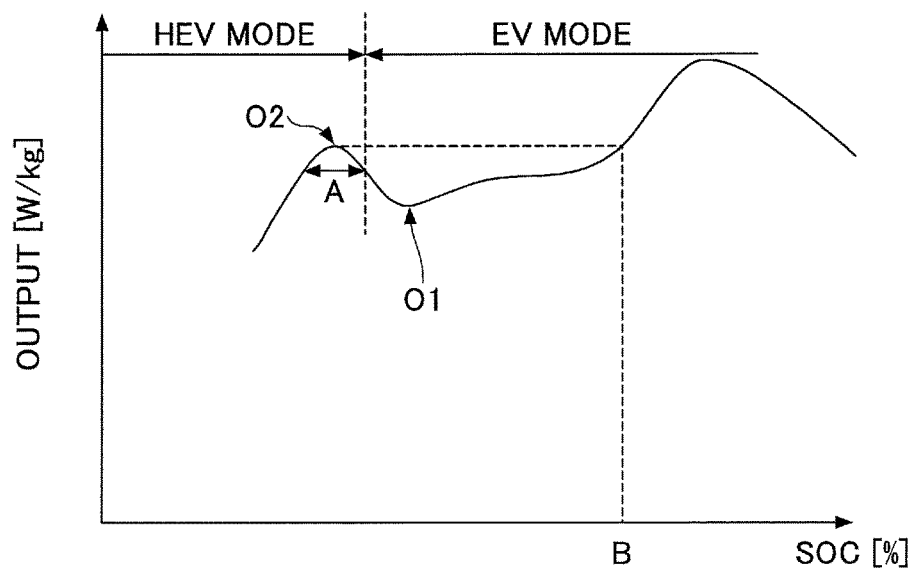
FIG. 7 illustrates the mode switching of the first embodiment.

The hybrid vehicle of the first embodiment performs the regeneration during an EV run. At this time, a SOC-output property illustrated in FIG. 7 may be applied so as to be sufficiently assisted by the motor 30. For example, in a case where the present SOC of the battery 11 becomes a point B or smaller, the regeneration operation for the battery 11 is not performed until the SOC reaches a local minimum value O1 to cause the SOC to be quickly transited to the range A. FIG. 7 illustrates the mode switching of the first embodiment. Here, a point B is the SOC corresponding to the output of the battery 1 equal to the local maximum value $O_2$ on a side of higher SOC than the local minimum value O1. With this, a running performance sufficient as the hybrid vehicle is smoothly ensured. Such a control can be performed by, for example, the system control unit 40.

Figure 8:
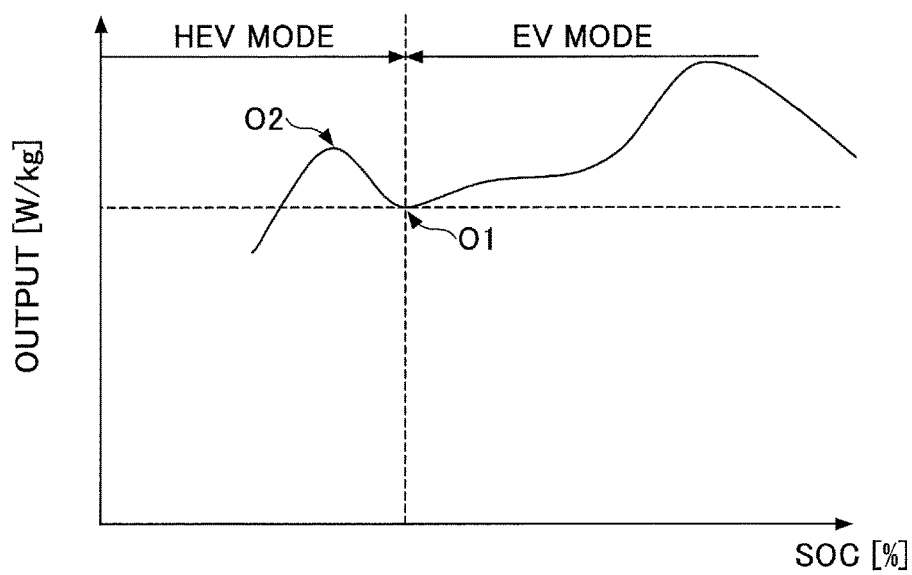
FIG. 8 illustrates the mode switching of the first embodiment.

Further, referring to FIG. 8, in the SOC-output property of the battery 11, a point corresponding to the output of the local minimum value O1 may be an intermediate point (a switching point) between the EV mode and the HEV mode. FIG. 8 illustrates the mode switching of the first embodiment. In this case, it is preferable that the total output from the engine 20 and the motor 30 is designed to be the minimum output necessary as the hybrid vehicle or more. With this, the structure is simplified such that the output power is compensated by only a power from the battery 11 and the engine 20 is solely used to charge the battery 11. This case does not prevent the engine 20 from being used for the run.

Figure 9:
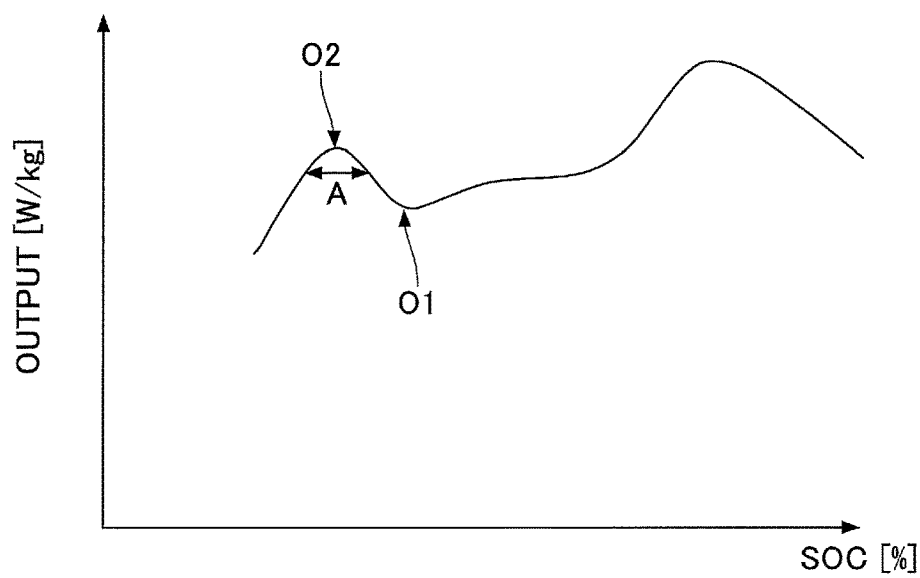
FIG. 9 illustrates the mode switching of the first embodiment.

Further, in a case where the battery 11 is used for the HEV, the system control unit 40 may control so that the range A is solely used as illustrated in FIG. 9. FIG. 9 illustrates the mode switching of the first embodiment. The battery is degraded more as the high SOC range is maintained longer. Therefore, in comparison with an ordinary battery used under a condition where the SOC is about 60% to 80%, the battery. 11 of the first embodiment may prolong its life duration because the HEV mode is used in the low SOC range. Further, when the low SOC side is used, a charging performance is enhanced. Therefore, a regeneration capability is enhanced to improve the fuel consumption.

Figure 10:
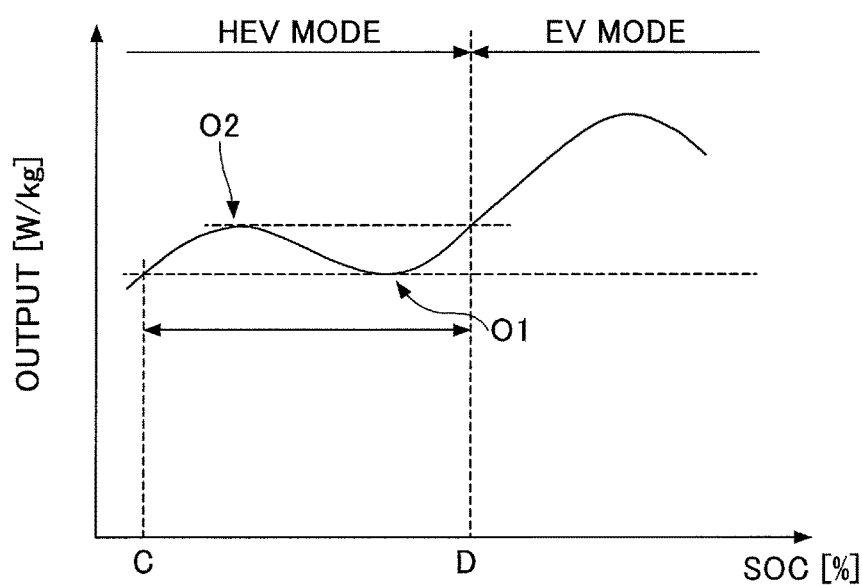
FIG. 10 illustrates the mode switching of the first embodiment.

Referring to FIG. 10, in the SOC-output property, there is a case where an output difference between the local minimum value O1, and the local maximum value $O_2$ is relatively small, and an output between C-D is relatively flat. In this case, the system control unit 40 may control so that the HEV mode undergoes in the SOC range including at least the range of C-D. FIG. 10 illustrates the mode switching of the first embodiment. The operation range between C-D of undergoing the HEV mode may not be a continuous one range and may include multiple operation ranges operated in the HEV mode between C-D.

Or, the point starting the HEV mode may be set to have a value smaller than C (on a side smaller than C). For example, it is controlled to start the HEV mode at a time point where the SOC becomes about 10%. The system control unit 40 may continue the HEV mode on the side of lower SOC than the point D. In all of these cases, the fuel consumption is presumed to be improved by a simple control.

Further, it is possible to control to start the HEV mode after completely using the battery in the EV mode. This is effective in a case where a run time in the EV mode is required to be prolonged.

As described above, the system control unit 40 may be controlled such that in all or a part of the SOC range equal to or less than the SOC (a first residual capacity D) corresponding to the output which is equal to less than the local maximum value O2 on the side of higher SOC side than the local minimum value O1 and equal to or more than the SOC (a second residual capacity D) corresponding to the output which is equal to more than the local minimum value O1 on the side of lower SOC side than the local maximum value $O_2$.

Second Embodiment

Next, a second embodiment of the present invention is described with reference to figures. Within the second embodiment, when the SOC value is included in a predetermined range having the local maximum value O2, the hybrid vehicle is operated in the first mode being the EV mode. This is a different point from the first embodiment. Within the second embodiment, only portions different from the first embodiment are described. Reference symbols are used for portions the same as those of the first embodiment, and description of these portions are omitted.

Figure 11:
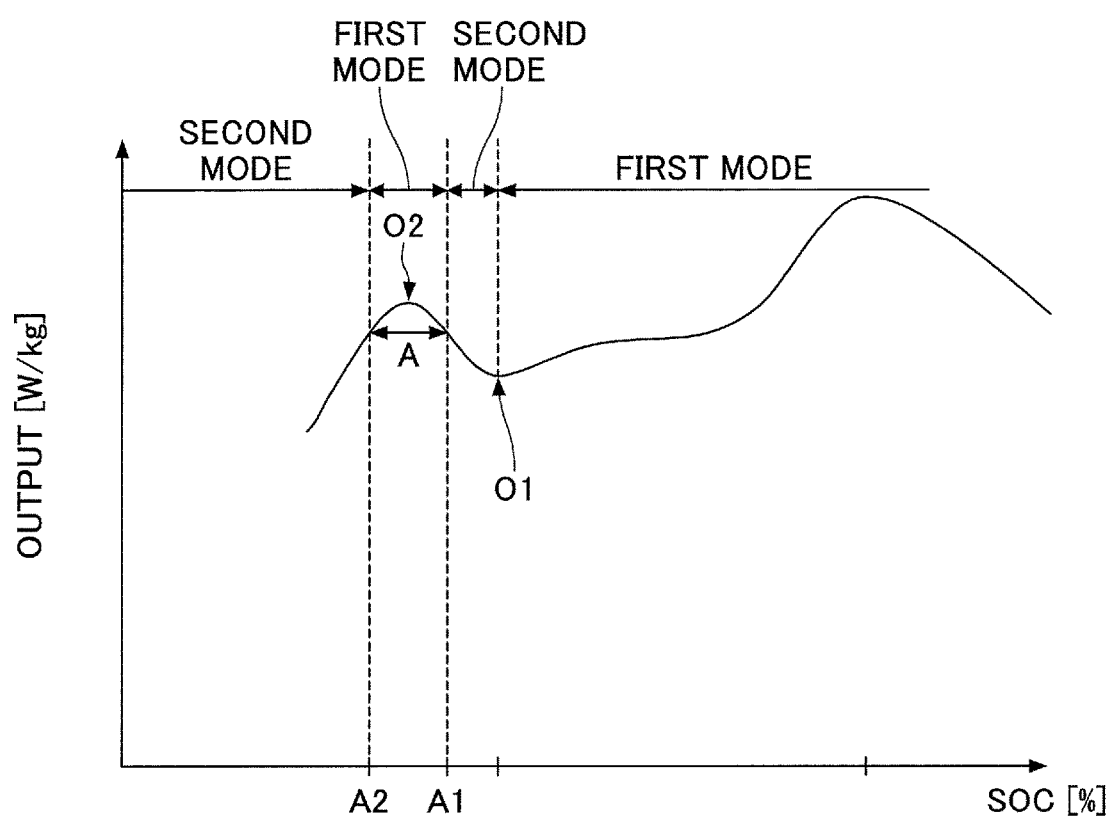
FIG. 11 illustrates a mode switching of a second embodiment.

FIG. 11 illustrates a mode switching of the second embodiment. Within the second embodiment, the battery control unit 50 switches the operation mode of the hybrid vehicle from the HEV mode of the second mode to the EV mode of the first mode when the SOC value in in the range A being a predetermined are including the local maximum value O2.

The battery control unit 50 of the second embodiment switches the operation mode from the EV mode to the HEV mode 50 when the SOC value drops lower than the value A2 being the minimum value of the range A.

The range A of the SOC value of the second embodiment is between the value A1 and the value A2. Within the second embodiment, the value A1 is between the SOC value corresponding to the output of the local minimum value $O_1$ and the SOC value corresponding to the output of the local maximum value O2. Specifically, the value A1 may be a SOC value corresponding to an intermediate value between the output values of the local minimum value O1 and the local maximum value O2.

The value A2 of the second embodiment may be lower than the SOC value corresponding to the output value of the local minimum value O1 and may be equal to the output value corresponding to the value A1. Further, the value A2 of the second embodiment may be an output value corresponding to a predetermined cutoff voltage (a discharge prohibition voltage).

The output of the ordinary lithium-ion battery is in a tendency of a monotonic decrease of dropping along with a drop of the SOC as illustrated in FIG. 2. Therefore, in a case where the operation mode is switched from the EV mode to the HEV mode due to a drop of the SOC in the hybrid vehicle in which this lithium-ion battery is mounted, an operation in the HEV mode continues and a switch from the operation mode again to the EV mode is not planned.

On the contrary, in the battery 11 of the second embodiment, the output values decreases to be the local minimum value O1 along with a drop of the SOC and thereafter increases again to become the local maximum value O2.

Therefore, within the second embodiment, after the operation mode is switched to the HEV mode due to the drop of the SOC, the operation mode is switched again to the EV mode in conformity with the increase of the output of the battery 11. Therefore, within the second embodiment, in comparison with the case where the ordinary lithium-ion battery is used, the hybrid vehicle is operable for a longer time period in the EV mode so as to improve the fuel consumption.

Further, in the battery 11 of the second embodiment, an input value caused by a regeneration operation in a case where the SOC value is in the range A is greater an input value caused by the regeneration operation in a case where the SOC value is greater than the value A1. Therefore, in the battery 11 of the second embodiment, both the output and the input become higher in the case where the SOC value is in the range A than in the case where the SOC value is greater than the value A1.

Therefore, within the second embodiment, it is possible to maintain the SOC value of the battery within the range A while operating the hybrid vehicle in the EV mode. Therefore, in order to obtain the output similar to the local maximum value O2 of the output obtained in the range A, it is unnecessary to charge until the SOC of the battery 11 becomes a value higher than the range A so as to improve the fuel consumption.

Further, within the second embodiment, by maintaining the SOC value of the battery 11 within the range A, the battery 11 maintains the SOC value relatively low so as to suppress degradation of the battery 11 and heat generation of the battery 11.

Figure 12:
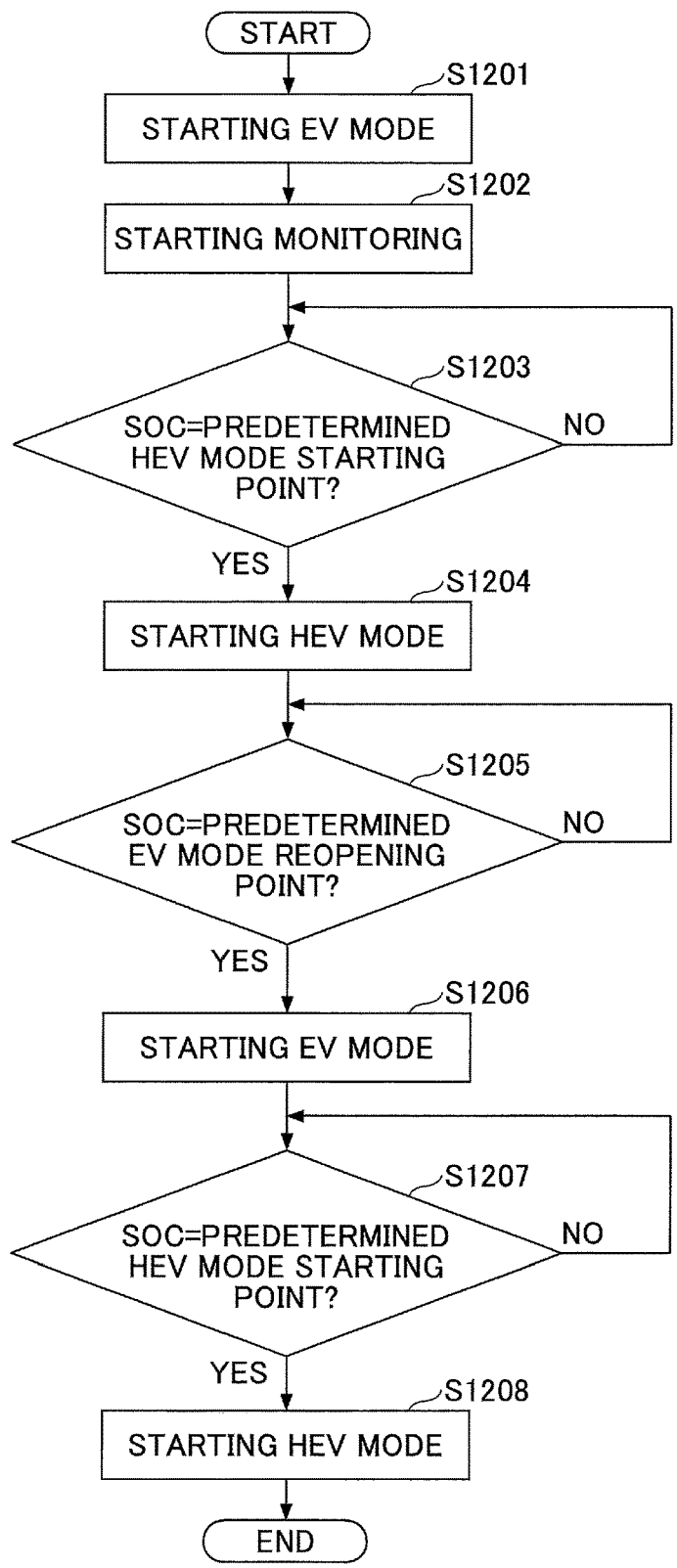
FIG. 12 is an exemplary flow chart of a mode switching of the second embodiment.

Hereinafter, an operation mode switching performed by the battery control unit 50 of the second embodiment is described. FIG. 12 is an exemplary flow chart of the mode switching of the second embodiment.

The process between step S1201 and step S1204 is similar to the process between step S601 and step S604. Therefore, a description is omitted.

Subsequent to step S1204, the battery control unit 50 determines whether the SOC value becomes an EV mode reopening point by the SOC estimation part 53 (step S1205). Specifically, the SOC estimation part 53 determines whether the SOC value becomes lower than the value A1. In a case where the SOC value is not lower than the value A1 in step 1205, the battery control unit 50 maintains the HEV mode until the SOC value becomes lower than the value A1.

In a case where the SOC value becomes lower than the value A1 in step 1205, the battery control unit 50 switches the operation mode from the HEV mode to the EV mode (step S1206) and reopens an operation in the EV mode.

Subsequently, the battery control unit 50 determines whether the SOC value becomes a HEV mode reopening point by the SOC estimation part 53 (step S1207). Specifically, the SOC estimation part 53 determines whether the SOC value becomes lower than the value A2. In a case where the SOC value is not lower than the value A2 in step 1207, the battery control unit 50 maintains the EV mode until the SOC value becomes lower than the value A2.

In a case where the SOC value becomes lower than the value A2 in step 1207, the battery control unit 50 switches the operation mode from the EV mode to the HEV mode (step S1208) and reopens an operation in the HEV mode.

As described above, when the SOC value of the battery is in a predetermined range including the value at which the output value corresponding to the SOC value becomes the local maximum value O2, the hybrid vehicle is operated in the EV mode. Said differently, in the second embodiment, the hybrid vehicle is operated in the EV mode in a low SOC range of the battery 11.

Therefore, in the second embodiment, the hybrid vehicle is operable in a longer time mode than the ordinary lithium-ion battery so as to improve the fuel consumption.

The low SOC range may be a range where the SOC value is less than 40%, and the high SOC range may be a range where the SOC value is equal to or greater than 40%.

Within the second embodiment, the SOC value at which the HEV mode is switched again to the EV mode is A1. However, the SOC value is not limited thereto. Within the second embodiment, the HEV mode may switch to the EV mode again, for example, at any point between the SOC corresponding to the output of the local minimum value O1 and the SOC corresponding to the output of the local maximum value O2.

Third Embodiment

A third embodiment of the present invention is described with reference to figures. Within the third embodiment, reference symbols similar to those in the first embodiment are used for portions having functions similar to those in the first embodiment, and description of these portions is omitted.

Figure 13:
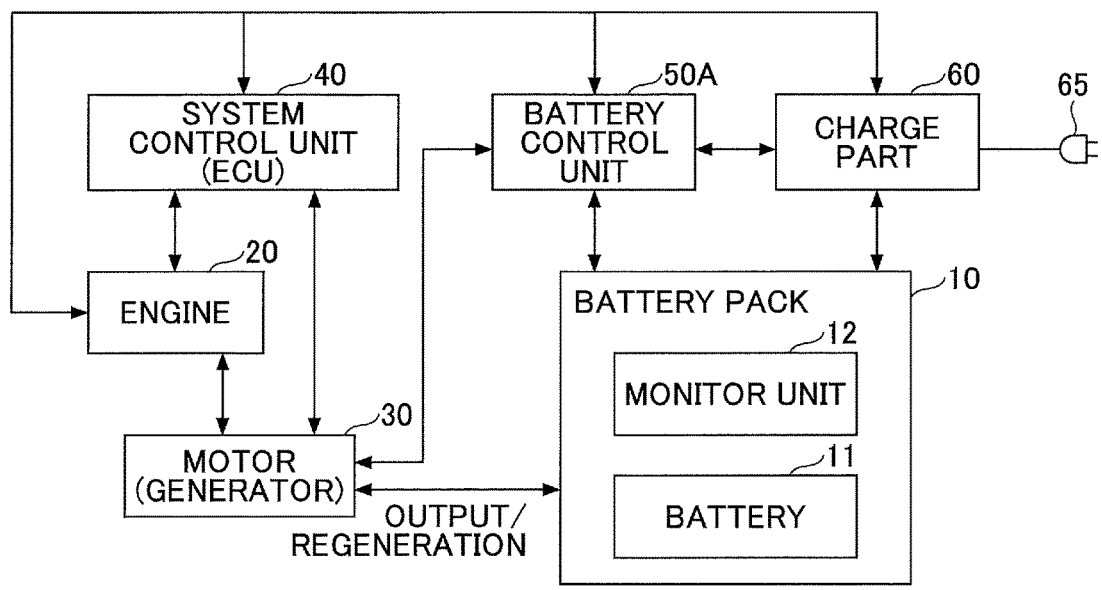
FIG. 13 illustrates a schematic structure of a hybrid vehicle to which a battery control unit of a third embodiment is applicable.

FIG. 13 illustrates a schematic structure of a hybrid vehicle to which a battery control unit of the third embodiment is applicable.

In the hybrid vehicle of the third embodiment, a battery control unit 50A is included in place of the battery control unit of the first embodiment.

In the battery control unit 50A of the third embodiment, the output from the battery 11 is stopped when the SOC value of the battery 11 becomes a first value and the output from the battery 11 is restarted when the SOC value of the battery 11 becomes a second value. Said differently, the battery control unit 50A is an output control device for controlling a stop and a reopen of the output from the battery 11.

The first value of the third embodiment is smaller than the second value. Detailed description of the first and second values are given later.

Figure 14:
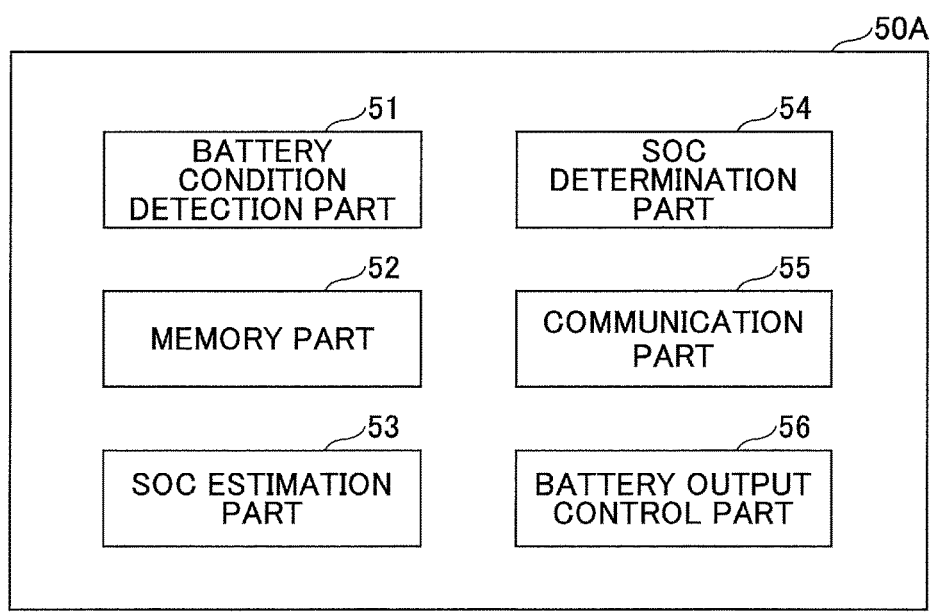
FIG. 14 is an exemplary functional block chart of a battery control unit of the third embodiment.

FIG. 14 is an exemplary functional block chart of the battery control unit of the third embodiment.

The battery control unit 50A of the third embodiment includes a battery output control part 56 in addition to various portions of the battery control unit 50 of the first embodiment.

The battery output control part 56 stops the output from the battery 11 of the battery pack 10 and charges the battery 11 by the regeneration operation of the motor 30 when the SOC value estimated by the SOC estimation part 53 becomes the first value. Said differently, the battery output control part 56 causes discharge from the battery 11 to stop and charge to start when the SOC value becomes the first value.

Further, the battery output control part 56 reopens the output from the battery 11 of the battery pack 10 when the SOC value estimated by the SOC estimation part 53 becomes the second value. Said differently, the battery output control part 56 causes the discharge from the battery 11 to start when the SOC value becomes the second value. At this time, the charge of the battery 11 performed by the regeneration operation may be continued or stopped.

Figure 15:
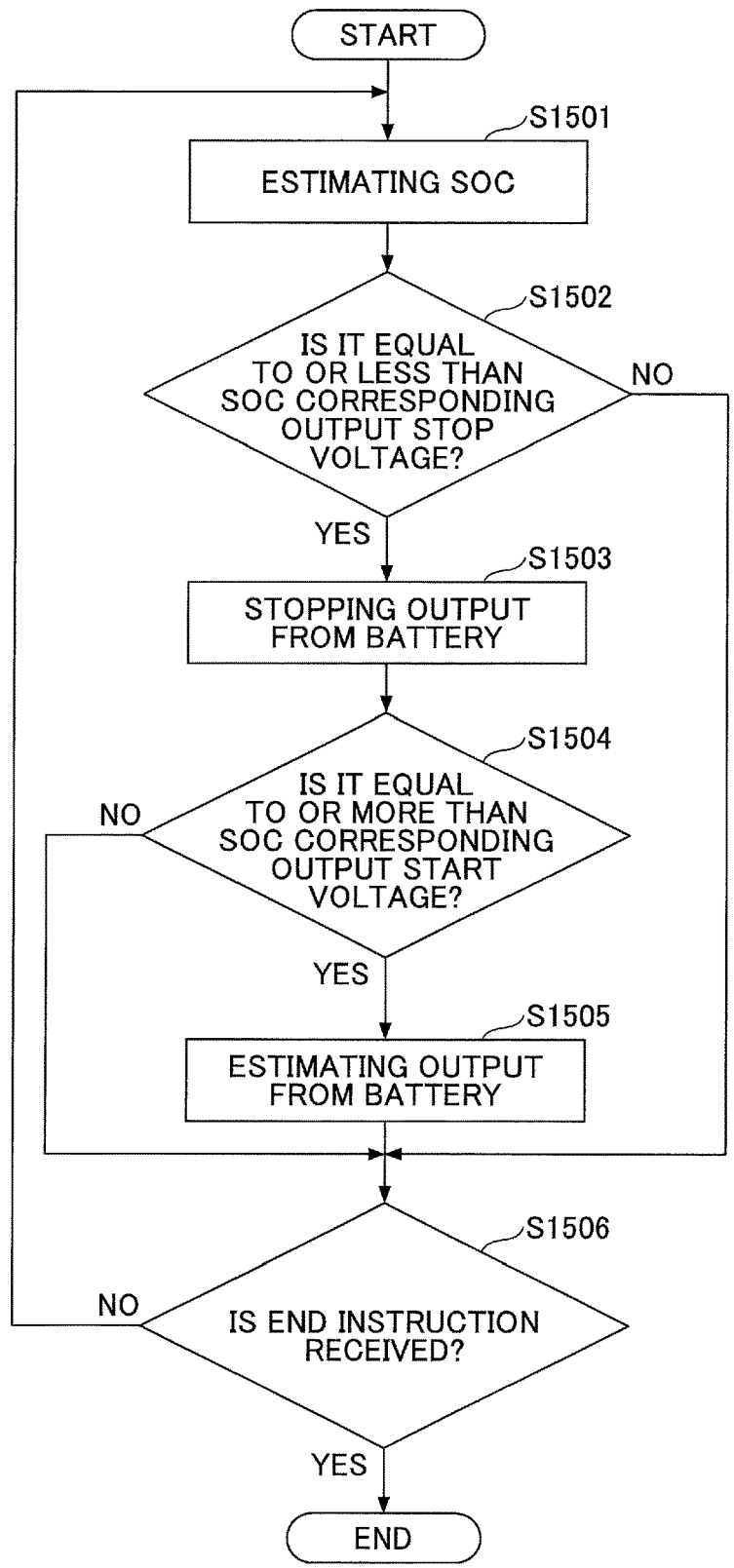
FIG. 15 is a flow chart explaining an operation of the battery control unit of the third embodiment.

FIG. 15 is a flow chart explaining an operation of the battery control unit of the third embodiment.

When the system control unit 40 starts up, the battery output control part 56 of the battery control unit 50A monitors the SOC value estimated by the SOC estimation part 53 (step S1501). Subsequently, the battery output control part 56 determines whether the SOC value is less than the first value (step S1502). Said differently, the battery output control part 56 determines whether the SOC value of the battery 11 becomes a value corresponding to a voltage of stopping the output from the battery 11.

In a case where the SOC value is not equal to or less than the first value in step S1502, the battery control unit 50A proceeds to step S1506 described later.

In a case where the SOC value is equal to or less than the first value in step S1502, the battery output control part 56 causes the output from the battery 11 to stop and simultaneously causes the charge to start by the regeneration operation (step S1503).

Subsequently, the battery output control part 56 of the battery control unit 50A determines whether the SOC value estimated by the SOC estimation part 53 becomes equal to or greater than the second value (step S1504). Said differently, the battery output control part 56 determines whether the SOC value becomes a value corresponding to a voltage of starting the output from the battery 11.

In a case where the SOC value is not equal to or greater than the second value in step S1504, the battery control unit 50A proceeds to step S1506 described later.

In a case where the SOC value becomes equal to or greater than the second value in step S1504, the battery output control part 56 of the battery control unit 50A permits the output from the battery (step S1505). Said differently, the battery output control part 56 releases the stop of the output from the battery 11 and reopens the output from the battery 11.

Subsequently, the battery control unit 50A determines whether an end instruction of the process is received from the system control unit 40 (step S1506). In a case where the end instruction is received in S1506, the battery control unit 50A ends the process. In a case where the end instruction is not received in S1506, the battery control unit 50A returns to step S1501.

As describe above, within the second embodiment, when the SOC value becomes equal to or smaller than the first value, the output from the battery stops and the charge starts, and when the SOC value becomes equal to or greater than the second value, the output from the battery is permitted. Said differently, the first value is the first threshold value for determining whether the output of the battery 11 is stopped and the charge is started, and the second value is the second threshold value for determining whether the output of the battery 11 is permitted.

Figure 16A:
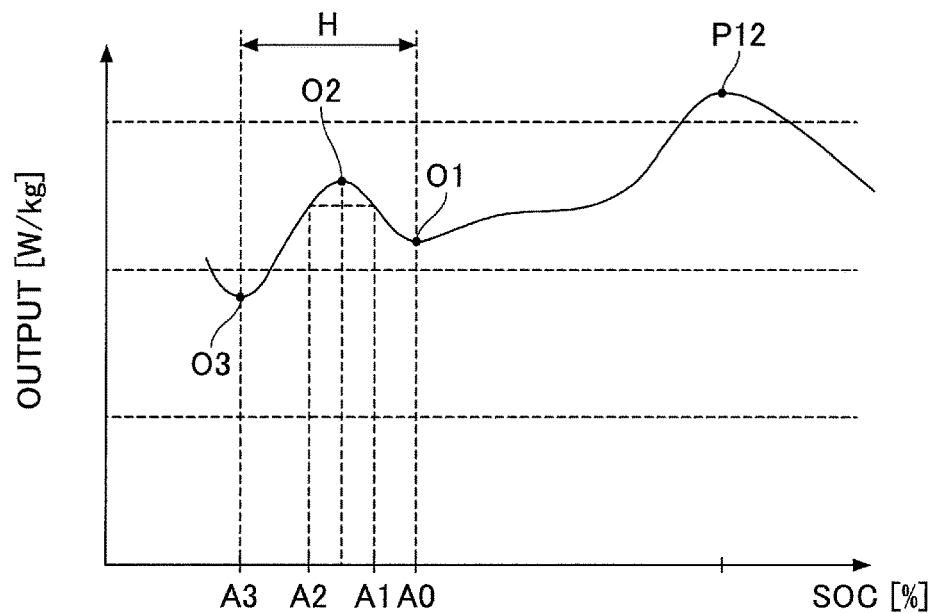
FIGS. 16A and 16B illustrate a property of a battery of the third embodiment.
Figure 16B:
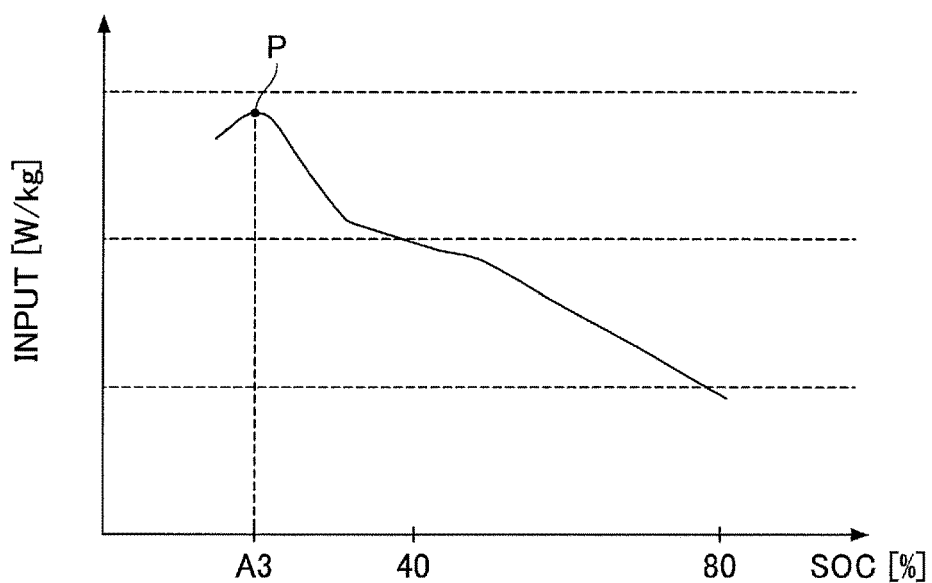

Next, referring to FIGS. 16A and 16B, the first value and the second value of the third embodiment are described. FIGS. 16A and 16B illustrate a property of the battery of the third embodiment. FIG. 16A illustrates a SOC-output property of the battery 11 and FIG. 16B illustrates a SOC-input property in the regeneration operation of the battery 11.

At first, the SOC-output property of the battery 11 is described. The battery 11 of the third embodiment has an output property where an output on a side of low SOC is greater than a part of an output on a side of high SOC.

Specifically, in the SOC-output property of the battery 11 of the third embodiment, an output corresponding to a predetermined SOC value A0 (near SOC=40% in FIG. 16) is a local minimum value O1 being a first local minimum value, and an output corresponding to a predetermined SOC value smaller than the SOC corresponding to the local minimum value O1 becomes the local maximum value O2. In the SOC-output property of the battery 11 of the third embodiment, an output corresponding to a predetermined SOC value A3 smaller than the value A0 is a local minimum value O3 being a second local minimum value.

Said differently, the battery 11 of the third embodiment has the first local minimum value O1 and the second local minimum value O3 in the SOC-output property. The second local minimum value O3 is smaller than the local minimum value O1, and the SOC value A3 corresponding to the second local minimum value O3 is smaller than the SOC value A0 corresponding to the first local minimum value O1. Further, the SOC value A3 corresponding to the second local minimum value O3 is smaller than the SOC value corresponding to the local maximum value O2.

Described next is a SOC-input property of the battery of the third embodiment. As illustrated in FIG. 16B, energy input into the battery 11 of the third embodiment increases as the SOC value drops until the SOC value becomes the predetermined value A3.

Therefore, the most energy is input in the battery of the third embodiment when the SOC has the value A3. Said differently, the battery 11 is most effectively charged when the SOC is near the value A3.

Therefore, within the third embodiment, the first value being the first threshold value is the value A3 and the second value being the second threshold value is the value A0.

The battery control unit 50A of the third embodiment causes the output from the battery 11 to stop when the SOC value becomes equal to or smaller than the value A3 and causes the battery 11 to be charged by the regeneration operation when the SOC value becomes equal to or smaller than the value A3. The battery control unit 50A prohibits the output of the battery 11 and only performs the charge by the regeneration operation until the SOC value of the battery becomes the value A0. Further, the battery control unit 50A permits the output from the battery 11 when the SOC value of the battery 11 is equal to or greater than the value A0.

Within the third embodiment, the charge is started by controlling the charge and discharge of the battery 11 as described above when the SOC value of the battery 11 becomes a value enabling the most efficient charge.

In the situation where the SOC value drops to the value A3, there is a possibility that the residual SOC is completely used depending on usage conditions of the battery. Therefore, in this situation, it is preferable to charge as quick as possible so as to increase the SOC value of the battery 11.

In the battery 11 of the third embodiment, the SOC value drops and simultaneously the energy input in the battery 11 increases. When the SOC value drops to be the value A3, the input energy becomes the maximum value P.

Within the third embodiment, the above point is focused on. When the SOC value drops to be the value A3, the output of the battery 11 is stopped, and the charge of the battery 11 is started by the regeneration operation. Within the third embodiment, the output of the battery 11 is permitted when the SOC value of the battery 11 becomes the value A0. The charge may be stopped or may not be stopped when the output from the battery is permitted.

Described below is why the output of the battery 11 is permitted when the SOC value of the battery 11 becomes the value A0.

Within the third embodiment, as illustrated in FIG. 16A, the output increases along with the SOC value after the output of the battery 11 becomes the local minimum value O1. Therefore, the output of the battery 11 greater than the local minimum value O1 is obtainable when the SOC value increases and decreases from the value A0.

In this case, in comparison with a case where a high output is obtained by increasing the SOC value by charging the battery 11, it is effective that an output similar to the high output is obtained by continuing the output from the battery so as to decrease the SOC value in consideration with heat or degradation of the battery 11 caused by the increase of the SOC. Within the third embodiment, the output of the battery 11 is permitted when the SOC value of the battery 11 becomes the value A0.

Within the third embodiment, in a case where an output greater than the local maximum value O2 is required in a range H of the SOC of the battery 11, the output of the engine may assist the local maximum value O2.

Within the embodiment, a time period while the SOC value of the battery is maintained in the range between the value A0 and the value A3 is prolonged by controlling the output from the battery 11.

In the range H of the third embodiment, the local maximum value O2 is included and an output similar to the output corresponding to the SOC value of about 70% is obtainable. Further, in the range H of the third embodiment, the energy input by the regeneration operation is greater than on the side of the higher SOC than the range H so as to enable a quick charge.

Therefore, within the third embodiment, by using the battery in the range H, the SOC value is quickly recovered to be the value A0 in a case where the SOC value is equal to or smaller than the value A3, and a high output is obtainable while maintaining the SOC value low when the SOC value becomes equal to greater than the value A0.

Meanwhile, in the ordinary lithium-ion battery, the SOC-output property has a tendency of a monotonic decrease where the output decreases along with a drop of the SOC, and a relationship between the SOC value at which the output from the lithium-ion battery is stopped and the SOC value at which the output from the lithium-ion battery is started is not considered.

Within the third embodiment, by maintaining the SOC value of the battery 11 having the above described SOC-output property and SOC-input property within the range H, a higher output than in a case where the ordinary lithium-ion battery having the same weight as that of the battery 11 is mounted on a hybrid vehicle is obtainable.

In the example illustrated in FIG. 16, the range H is between the SOC value A0 and the SOC value A3. However, the range H is not limited thereto. The range H of the third embodiment may include, for example, the SOC value corresponding to the local maximum value O2. The range H of the third embodiment is preferably between the value A0 and the value A3.

Therefore, the range H of the third embodiment may be between the value A1 and the value A2, between the value A0 and the value A2, or between the value A1 and the value A3.

As described, within the third embodiment, by using the battery under a state where the SOC is in the range H, the SOC of the battery 11 may be maintained relatively low so as to restrict the degradation and the heat of the battery 11. Further, within the third embodiment, because the heat of the battery 11 is restricted, the energy for cooling is not necessitated so as to improve the fuel consumption.

Although the SOC value permitting the output from the battery 11 is the value A0, the SOC value permitting the output from the battery 11 may be a value between the value A00 and the SOC value A2 corresponding to the local maximum value O2.

Fourth Embodiment

A fourth embodiment of the present invention is described in reference of figures. The fourth embodiment is a mode of applying the third embodiment to an electronic apparatus. Within the fourth embodiment, reference symbols similar to those in the third embodiment are used for portions having functions similar to those in the third embodiment, and description of these portions is omitted.

Figure 17:
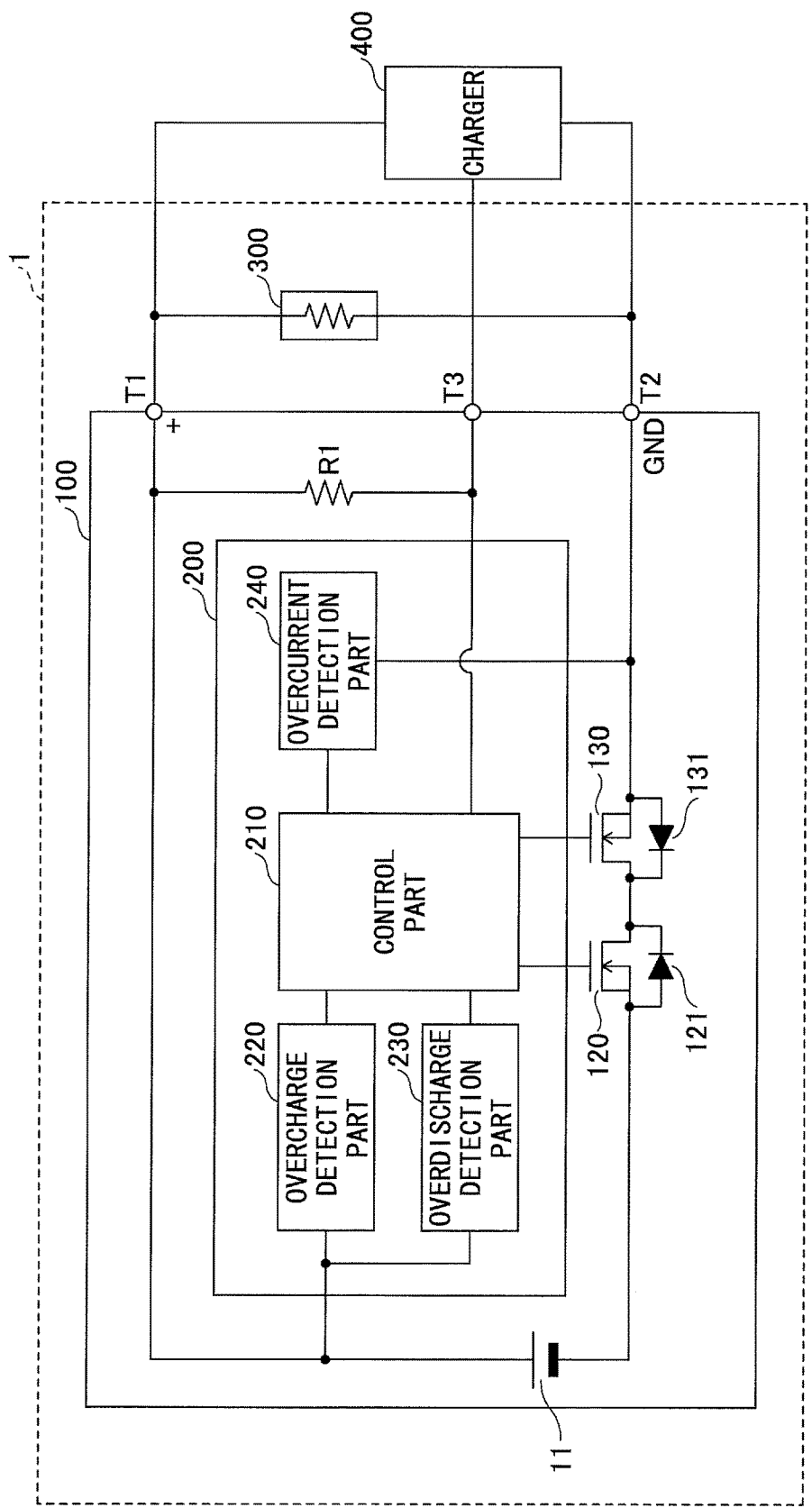
FIG. 17 schematically illustrates an electronic device of a fourth embodiment.

FIG. 17 schematically illustrates the electronic device of the fourth embodiment. The electronic apparatus 1 of the fourth embodiment includes a battery pack 100 and a load 300 and is connected with the charger 400.

The battery pack 100 of the fourth embodiment includes a terminal T1, a terminal T2, a charger connection terminal T3, a resistor R1, the battery 11, a protection circuit 200, a discharge control switch element SW120, a charge control switch element SW130 and parasitic diodes 121 and 131.

The protection circuit 200 of the fourth embodiment is a semiconductor device for controlling a charge and a discharge of the battery 11. The protection circuit 200 includes a control part 210, an overcharge detection part 220, and an overdischarge detection part 230, and an overcurrent detection part 240.

The control part 210 of the fourth embodiment is a microcomputer or the like of controlling to turn on (ON) or turn off (OFF) the discharge control switch element SW120 and the charge control switch element SW130. Said differently, the control part 210 of the fourth embodiment functions as a charge discharge control device.

The overcharge detection part 220 detects an overcharge of the battery 11. The overcharge detection part 230 detects an overcharge of the battery 11. The overcharge detection part 240 detects an overcharge flowing through the battery 11.

In the battery pack 100, a terminal T1 is connected on a positive (+) side of the battery 11 and a terminal T2 is connected on a negative (−) side of the battery 11. The terminals T1 and T2 are input terminals through which a charge current from the charger 400 is input at a time of charging the battery 11. The parasitic diodes 121 and 131 are provided in the switch terminals SW120 and SW130, respectively.

The overcharge detection part 220 of the fourth embodiment monitors the battery voltage so that the battery 11 is not overcharged. In a case where the battery voltage is lower than a predetermined charge prohibition voltage, the overcharge detection part 220 reports to the control part 210 to inform that the battery 11 is in an ordinary state. In the ordinary state, the control part 210 makes the gate of the switch element SW130 a high (H) level to turn on the switch element SW130 and apply a charge current.

In a case where the battery voltage is equal to or greater than the charge prohibition voltage, the overcharge detection part 220 reports to the control part 210 to inform that the battery 11 is in an overcharge state. In the overcharge state, the control part 210 makes the gate of the switch element SW130 a low (L) level to turn off the switch element SW130 and cut off the charge current.

The overdischarge detection part 230 monitors the battery voltage so that the battery 11 does not undergo the overdischarge. In a case where the detection voltage is higher than a predetermined discharge prohibition voltage, the overdischarge detection part 230 reports to the control part 21 to inform that the battery 11 is in the ordinary state. In the ordinary state, the control part 210 makes the gate of the switch element SW120 a high (H) level to turn on the switch element SW120 and apply a discharge current.

In a case where the battery voltage is equal to or smaller than a discharge prohibition voltage, the overdischarge detection part 230 reports to the control part 210 to inform that the battery 11 is in an overdischarge state. In the overdischarge state, the control part 210 makes the gate of the switch element SW120 a low (L) level to turn off the switch element SW120 and cut off the discharge current.

The overcurrent detection part 240 of the fourth embodiment converts the currents flowing through the switch elements SW120 and SW130 to voltage values and monitors the voltage values to protect the battery 11 from an overcurrent caused by an abnormal load or a short circuit in a load.

In a case where the detection voltage is lower than a predetermined overcurrent setup voltage, the overcurrent detection part 240 reports to the control part 210 to inform that the battery 11 is in the ordinary state.

In the ordinary state, the control part 210 makes the gate of the switch element SW120 the high (H) level to turn on the switch element SW120 and apply the discharge current. In a case where the battery voltage is equal to or greater than the overcurrent setup voltage, the overcurrent detection part 240 reports to the control part 210 to inform that the battery 11 is in an overcurrent state. In the overcurrent state, the control part 210 makes the gate of the switch element SW120 the low (L) level to turn off the switch element SW120 and cut off the discharge current.

Within the fourth embodiment, the discharge prohibition voltage is, for example, the battery voltage corresponding to the SOC value A3 of the battery 11 (see FIGS. 16A and 16B). When the battery voltage of the battery 11 becomes the battery voltage corresponding to the SOC value A0 of the battery 11, the control part 210 of the fourth embodiment makes the gate of the switch element SW120 the high (H) level to turn on the switch element SW120 and reopen to apply the discharge current.

Figure 18:
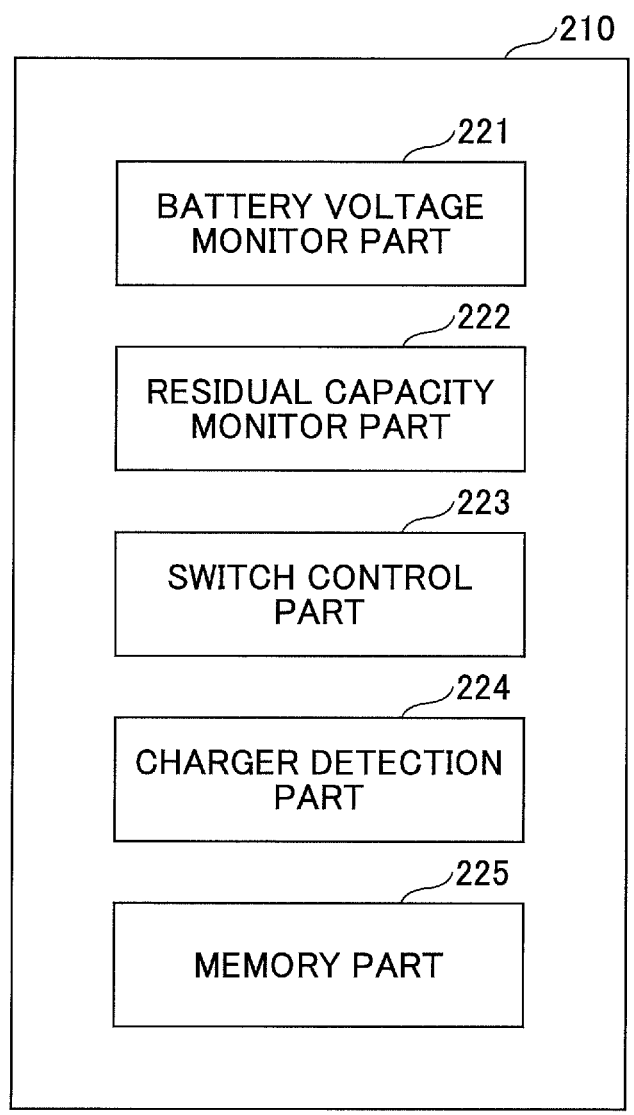
FIG. 18 illustrates a functional structure of a control part of the fourth embodiment.

Referring to FIG. 18, the control part 210 of the fourth embodiment is described. FIG. 18 illustrates a functional structure of the control part of the fourth embodiment.

The control part 210 of the fourth embodiment includes a battery voltage monitor part 221, a residual capacity monitor part 222, a switch control part 223, a charger detection part 224, and a memory part 225.

The battery voltage monitor part 221 monitors the battery voltage of the battery 11. The residual capacity monitor part 222 monitors the residual capacity (SOC) of the battery 11. Specifically, the residual capacity monitor part 222 reads information which is stored in the memory part 225 and indicates the SOC-output property of the battery 11, and estimates an SOC corresponding to the present voltage of the battery 11.

The switch control part 223 controls to turn on or of the switch element SW120 and the switch element SW130.

The charger detection part 224 detects a connection of the charger 400 based on a voltage change between the terminal T1 and the charger connection terminal T3.

The memory part 225 stores information indicative the SOC-output property of the battery 11. The information stored in the memory part 225 may include information indicative of the SOC-output property of the battery illustrated in, for example, FIG. 16A and information indicative of the SOC-input property of the battery illustrated in, for example, FIG. 16B. The information stored in the memory part 225 may be stored so as to be associated with each of different temperatures.

Figure 19:
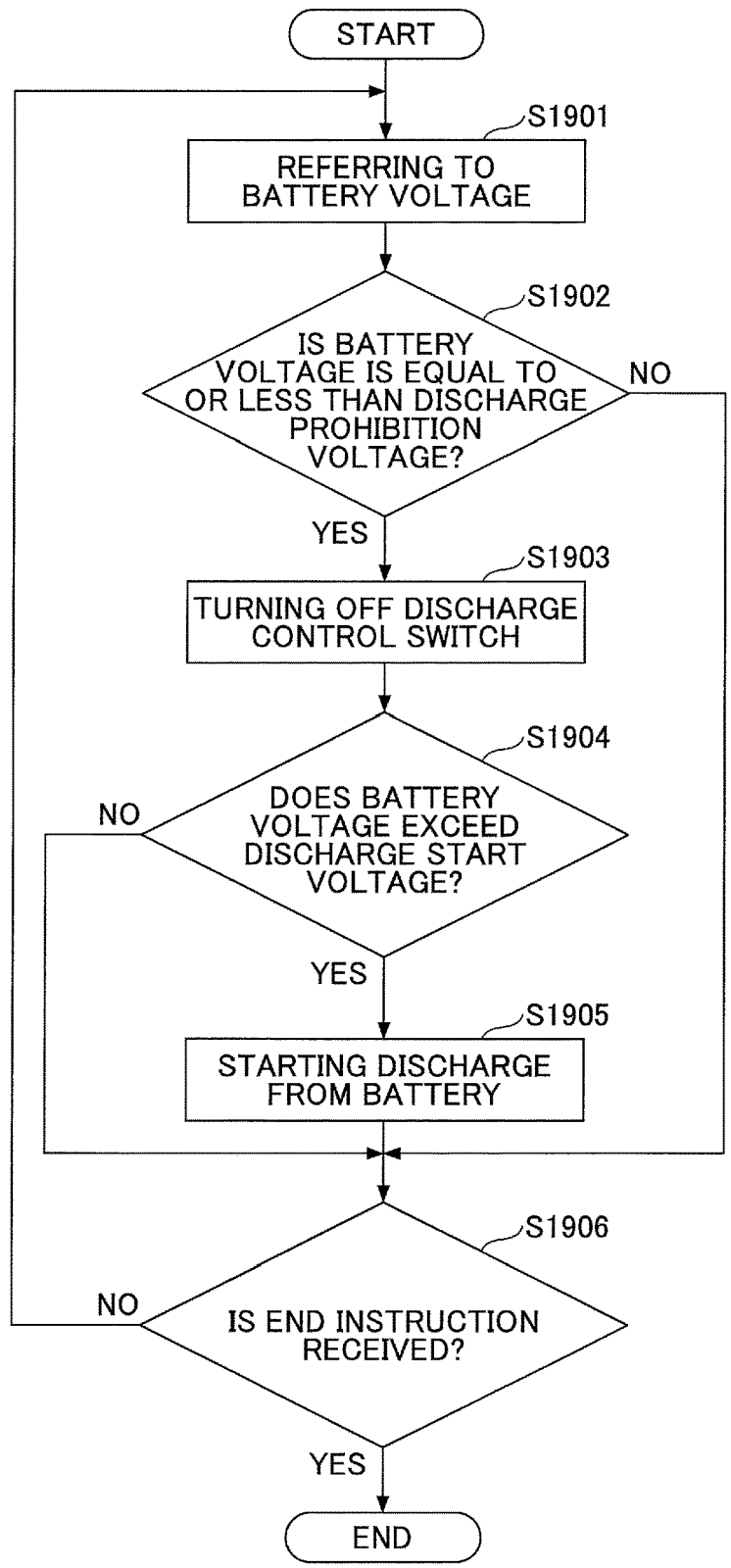
FIG. 19 is a flow chart explaining an operation of the control part of the fourth embodiment.

Referring to FIG. 19, the control part 210 of the fourth embodiment is described. FIG. 19 is a flow chart explaining an operation of the control part of the fourth embodiment.

The control part 210 of the fourth embodiment refers to the battery voltage of the battery 11 by the battery voltage monitor part 221 (step S1901). Subsequently, the control part 210 determines whether the battery voltage is equal to or smaller than the discharge prohibition voltage (step S1902).

In a case where the battery voltage is not equal to or smaller than the discharge prohibition voltage, the control part 210 goes to step S1906 described later.

In step S1902, in a case where the battery voltage is equal to or smaller than the discharge prohibition voltage, the control part 210 turns off the switch element SW120 being a switch for discharge control (step S1903). Because the electronic apparatus 1 of the fourth embodiment is connected to the charger 400, the charger 400 starts the charge when the switch element SW120 is turned off.

Subsequently, the voltage monitor part 221 of the control part 210 determines whether the battery voltage exceeds a discharge start voltage (step S1904). Within the fourth embodiment, the battery voltage corresponding to the SOC value A0 of the battery 11 is the discharge start voltage.

In a case where the battery voltage does not exceed the discharge start voltage, the control part 210 goes to step S1906 described later.

In a case where the battery voltage exceeds the discharge start voltage in step S1904, the switch control part 223 of the control part 210 turns on the switch element SW120 to reopen to apply the discharge current.

Subsequently, the control part 210 determines whether an instruction of ending the process is received (step S1906). In a case where the instruction of ending the process is not received in step S1906, the control part 210 returns to step S1901.

In a case where the instruction of ending the process is received in step S1906, the control part 210 ends the process.

As described, because the battery 11 is maintained to be in a state where the SOC value of the battery 11 is relatively low, the degradation and the heat of the battery 11 are restricted.

The electronic device 1 of the fourth embodiment is, for example, a terminal device such as a mobile phone and a smartphone. The electronic device 1 of the fourth embodiment may be any device as long as the device is driven by being supplied with electric power from a chargeable and dischargeable battery and electric power supplied from an electric power source other than the chargeable and dischargeable battery.

For example, the embodiments are described using the PHEV or the HEV are used as an example of the movable body, which is enabled to mount the operation mode control device of the present invention and performs the hybrid run. However, the movable body is not limited to the PHEV or the HEV, and may be a train enabled to run by using a diesel engine and a battery in combination or a motorcycle. Further, the movable body may be a carrier robot used in a factory or the like and enabled to run by using the engine and a battery in combination. Furthermore, a part of the movable body may move without moving the entirety of the movable body. For example, the movable body may be an assembly robot which is disposed in a manufacturing line of a factory and combinatorially uses an engine and a battery to move an arm of the assembly robot or the like.

The disclosed technique provides the operation mode control device enabling to improve the running performance and the fuel consumption of the movable body of performing the hybrid run and prolong the life duration of the battery mounted on the movable body.

APPENDIX

The embodiments include the following features.

[1] An operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, wherein the operation mode control device is configured to control to switch between a first mode, in which only power of the motor operates, and a second mode, in which both the power of the motor and power of the engine operate, wherein the operation mode is controlled to have an operation range, in which the second mode is performed when an output is on the side of lower residual capacity than the local minimum value.

[2] An operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, wherein the operation mode control device is configured to control to switch between a first mode, in which only power of the motor operates, and a second mode, in which both the power of the motor and power of the engine operate, wherein the operation mode is controlled to have an operation range, in which the movable body operates in the second mode, among all or a part of a range equal to or less than a first residual capacity and equal to or greater than a second residual capacity, the first residual capacity corresponding to the output equal to the local maximum value on the side of higher residual capacity than the local minimum value, the second residual capacity corresponding to the output equal to the local minimum value on a side of lower residual capacity than the local maximum value.

[3] The operation mode control device according to [2], wherein in a case where a current residual value of the battery reaches a predetermined residual capacity, the operation mode is switched from the first mode to the second mode.

[4] The operation mode control device according to [3], wherein the predetermined residual capacity is set to be a value equal to or less than the first residual capacity.

[5] The operation mode control device according to [2] to [4], wherein in a case where the current residual value of the battery becomes equal to or less than the first residual capacity, a regeneration operation for the battery is controlled so as not to be performed until the current residual value reaches the local minimum value.

[6] The operation mode control device according to [2], wherein in a case where the current residual value of the battery becomes equal to or less than second residual capacity, the operation mode is switched from the first mode to the second mode so as to start an operation of the second mode.

[7] The operation mode control device according to [1] to [6], wherein a material of an electrode of the battery includes lithium vanadium phosphate having a basic skeleton of $Li_3V_2(PO_4)_3$ or an analogous compound in which a structure of the lithium vanadium phosphate is denaturalized.

[8] A movable body comprising:
the operation mode control device according to [1] to [7];
the battery;
the motor; and
the engine.

[9] The movable body according to [8],
wherein the local minimum value is equal to or more than a minimum output necessary for the movable body.

[10] A method for controlling an operation mode of a movable body including a battery having a residual capacity-output property including a local minimum value and a local maximum value on a side of a lower residual capacity than the local minimum value, a motor operable by electric power supplied by the battery, and an engine, the method comprising:

controlling the operation mode to be switched between a first mode, in which only power of the motor operates, and a second mode, in which both the power of the motor and power of the engine operate, wherein, in the controlling, the operation mode is controlled to have an operation range, in which the second mode is performed when an output is on the side of lower residual capacity than the local minimum value.

[11] A method for controlling an operation mode of a movable body including a battery having a residual capacity-output property including a local minimum value and a local maximum value on a side of a lower residual capacity than the local minimum value, a motor operable by electric power supplied by the battery, and an engine, the method comprising:

controlling the operation mode to be switched between a first mode, in which only power of the motor operates, and a second mode, in which both the power of the motor and power of the engine operate, wherein, in the controlling, the operation mode is controlled to have an operation range, in which the movable body operates in the second mode, among all or a part of a range equal to or less than a first residual capacity and equal to or greater than a second residual capacity, the first residual capacity corresponding to the output equal to the local maximum value on the side of higher residual capacity than the local minimum value, the second residual capacity corresponding to the output equal to the local minimum value on a side of lower residual capacity than the local maximum value.

[12] An operation mode control device for controlling an operation mode of a movable body including a battery having a residual capacity-output property including a local minimum value and a local maximum value on a side of a lower residual capacity than the local minimum value, a motor operable by electric power supplied by the battery, and an engine, wherein the operation mode control device is configured to control to switch between a first mode, in which only power of the motor operates, and a second mode, in which both the power of the motor and power of the engine operate, wherein the movable body is operated in the first mode in a range of an output of the battery from a value on a side of higher residual capacity than the local maximum value between the local minimum value and the local maximum value to a value on a side of lower residual capacity than the local maximum value between the local minimum value and the local maximum value.

[13] An output control device included in a movable body including a battery having a residual capacity-output property including a local minimum value and a local maximum value on a side of a lower residual capacity than the local minimum value, the output control device comprising:

a control part configured to stop an output from the battery and start to charge the battery when a residual capacity of the battery becomes smaller than a residual capacity corresponding to the local maximum value, and configured to release the stop of the output from the battery when the residual capacity of the battery becomes a residual capacity corresponding to the local minimum value.

[14] The output control device according to [13], wherein the residual capacity-output property includes another local minimum value being smaller than the local minimum value on a side of lower residual capacity than the local maximum value, and wherein the control part causes the output from the battery to stop and causes the charge of the battery to start when the residual capacity of the battery becomes a residual capacity corresponding to the another local minimum value.

[15] The output control device according to [13], wherein the control part causes the output from the battery to stop and causes the charge of the battery to start when the residual capacity of the battery becomes a residual capacity corresponding to a maximum value of the input in a residual capacity-input property.

[16] A movable body comprising:
the output control device according to [13] to [15];
the battery;
a motor; and
an engine.

[17] A charge discharge control device included in an electronic device driven by electric power discharged by a battery having a residual capacity-output property including a local minimum value and a local maximum value on a side of a lower residual capacity than the local minimum value, the charge discharge control device configured to stop a discharge from the battery when a residual capacity of the battery becomes smaller than a residual capacity corresponding to the local maximum value.

[18] The charge discharge control device according to [17], wherein the charge discharge control device is configured to release the stop of the discharge from the battery when the residual capacity of the battery becomes a residual capacity corresponding to the local minimum value.

[19] The charge discharge control device according to [17] to [18], wherein the charge discharge control device is connected with an external electric power source, and wherein the charge discharge control device causes the discharge from the battery to stop and causes a charge of the battery to start by electric power supplied from the external electric power source when the residual capacity of the battery becomes smaller than the residual capacity corresponding to the local maximum value.

[20] The charge discharge control device according to [19], wherein the residual capacity-output property includes another local minimum value being smaller than the local minimum value on a side of lower residual capacity than the local maximum value, and wherein the charge discharge control device causes the discharge from the battery to stop and causes the charge of the battery to start by the electric power supplied from the external electric power source when the residual capacity of the battery becomes a residual capacity corresponding to the another local minimum value.

[21] An electronic device comprising:
the charge discharge control device according to [17] to [20]; and
the battery.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an operation mode control device has been described in detail, it should be understood that various changes, substitutions, and alterations could be made thereto without departing from the spirit and scope of the invention.

This application is based upon and claims the benefit of priority of the prior Japanese Patent Application No. 2014-266027, filed on Dec. 26, 2014, and the Japanese Patent Application No. 2015-210933, filed on Oct. 27, 2015, the entire contents of which are incorporated herein by reference.

What is claimed is:

1. An operation mode control device for controlling an operation mode of a movable body, the operation mode control device comprising:
a processor;
a plurality of switches that controls the charging and discharging of a battery of the movable body; and
a memory configured to store program instructions that cause the processor to
monitor a residual capacity of the battery, and
control the plurality of switches based on the residual capacity of the battery,
wherein
the battery
includes an electrode formed from a material that includes lithium vanadium phosphate, having a basic skeleton of $Li_3V_2(PO_4)_3$ or an analogous compound, in which a structure of the lithium vanadium phosphate is denaturalized, the material of the electrode being prepared by mixing lithium vanadium phosphate with a ternary material, and
has a residual capacity-output property including a first local minimum output value at a first residual capacity value of around 40%, a first local maximum output value on a side of lower residual capacity than the first local minimum output value, a second local maximum output value on the side of higher residual capacity than the first local minimum output value and a second local minimum output value on the side of lower residual capacity than the first local maximum output value, and
the moveable body further includes:
a motor operable by electric power supplied by the battery, and
an engine,
the operation mode control device being configured to control the plurality of switches to switch between a first mode, in which only the battery is discharged to operate the motor, and a second mode, in which power of the engine is used to supplement the power of the motor or charge the battery,
wherein the operation mode is controlled to
operate in the first mode above a first threshold residual capacity that is within a range of the residual capacity from a second residual capacity at the second local maximum output value to the first residual capacity at the first local minimum output value;
switch to the second mode after the residual capacity falls below the first threshold residual capacity and operate in the second mode within the range of the residual capacity from the first threshold residual capacity to a second threshold residual capacity, the second threshold residual capacity being within the range of the residual capacity from the first residual capacity at the first local minimum output value to a third residual capacity at the first local maximum output value, and switch back to the first mode after the residual capacity of the battery falls below the second threshold residual capacity and operate in the first mode within the range of the residual capacity from the second threshold residual capacity to a third threshold residual capacity, the third threshold residual capacity being equal to or lower than a residual capacity corresponding to an output value that is both equal to the output value of the second threshold residual capacity and on the side of lower residual capacity than the third residual capacity at the first local maximum output value, wherein discharge of the battery is prohibited after the residual capacity of the battery falls below the third threshold residual capacity, whereupon the battery is charged using the power of the engine.

2. A movable body comprising:
the operation mode control device according to claim 1;
the battery;
the motor; and
the engine.

3. The movable body according to claim 2,
wherein the first local minimum output value is equal to or more than a minimum output necessary to propel the movable body in the first mode.

4. The operation mode control device according to claim 1, wherein the ternary material includes at least one of nickel, cobalt, and aluminum.

\* \* \* \* \*